United States Patent
Beer et al.

(10) Patent No.: US 6,329,047 B1
(45) Date of Patent: Dec. 11, 2001

(54) THERMOFORMABLE COMPOSITE FILM

(75) Inventors: DI. Ekkehard Beer, Bad Schwalbach; Wilfried Hatke, Hofheim, both of (DE)

(73) Assignee: Ticona GmbH (DE)

(*) Notice: Subject to any disclaimer, the term of this patent is extended or adjusted under 35 U.S.C. 154(b) by 0 days.

(21) Appl. No.: 09/356,821

(22) Filed: Jul. 19, 1999

(30) Foreign Application Priority Data

Jul. 20, 1998 (DE) .............................. 198 32 500

(51) Int. Cl.[7] .............................. B32B 7/02; B32B 27/08
(52) U.S. Cl. .............. 428/215; 428/517; 428/518; 428/520
(58) Field of Search .................. 428/34.1, 34.9, 428/35.2, 35.4, 35.7, 36.6, 36.7, 36.9, 36.91, 220, 332, 337, 339, 411.1, 500, 515, 215, 517, 518, 520

(56) References Cited

U.S. PATENT DOCUMENTS

| | | | |
|---|---|---|---|
| 5,532,030 | * 7/1996 | Hirose et al. | 428/35.7 |
| 5,783,273 | * 7/1998 | Yamamoto et al. | 428/35.9 |
| 5,874,173 | * 2/1999 | Wenning | 428/425.8 |

FOREIGN PATENT DOCUMENTS

| | | |
|---|---|---|
| 498 384 | 5/1992 | (EP) . |
| 570 188 | 11/1993 | (EP) . |
| 649 737 | 4/1995 | (EP) . |
| 773 102 | 5/1997 | (EP) . |
| 800 914 | 10/1997 | (EP) . |
| 920 989 | 6/1999 | (EP) . |

* cited by examiner

Primary Examiner—D. S. Nakarani
Assistant Examiner—Sheeba Ahmed
(74) Attorney, Agent, or Firm—Connolly Bove Lodge & Hutz LLP

(57) ABSTRACT

The present invention relates to a thermoformable composite film comprising at least one film which comprises cycloolefin copolymer and comprising, laminated to at least one side of this film, a thermoplastic film. The thermoformable film is obtainable by using a solvent-free single-component adhesive to apply the thermoplastic film laminated to the film which comprises cycloolefin copolymer. The film which is laminated is a PVDC-containing thermoplastic film. The thickness of the entire film is from 100 to 500 μm, the thickness of PVDC film is from 5 to 150 μm and the thickness of the COC film is from 50 to 400 μm. The thermoformable composite film is used to produce blister packs.

5 Claims, 7 Drawing Sheets

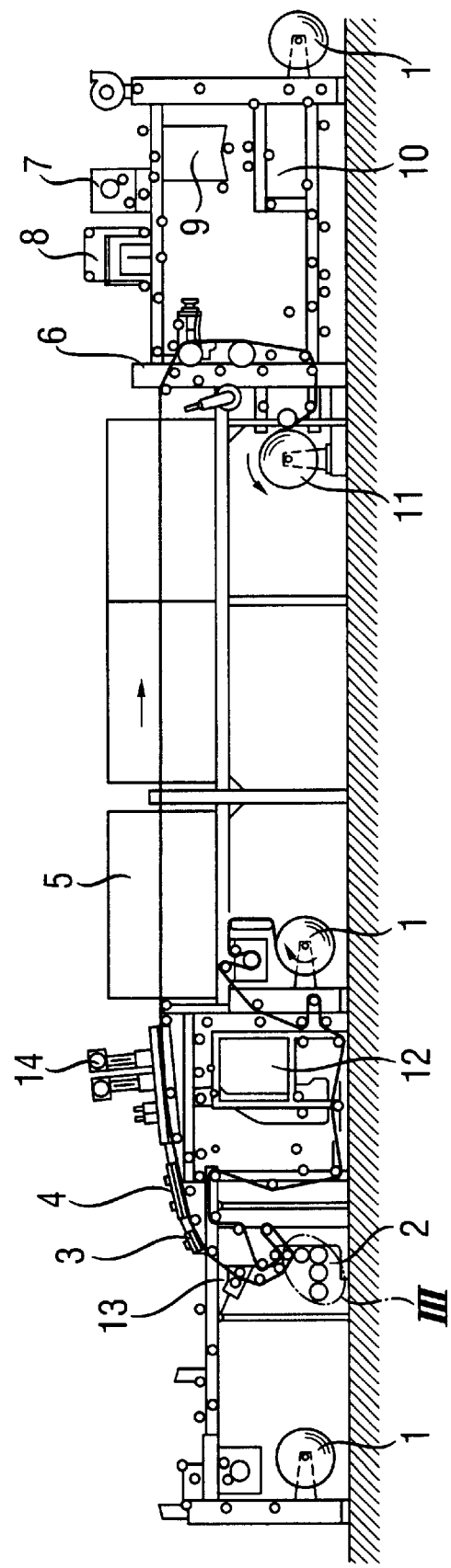

THERMOFORMABLE COMPOSITE FILM

The present invention relates to a thermoformable composite film, a process for producing a thermoformable composite film and the use of the film as a packaging material.

To produce high-performance packaging, flexible films are molded to the shape of a tray or capsule using the action of heat and pressure and a mechanical ram at super- and/or subatmospheric pressure. The film serves firstly to protect the contents. To protect the contents from the effects of the environment the film must therefore have a high level of barrier properties with respect to water-vapor, gases and UV. It must have mechanical stability to protect the contents from physical effects, and so that it does not itself become damaged by the contents. The quality of the contents must not be impaired by constituents released from within the film.

Blister packs are increasingly frequently chosen as packaging for a wide variety of articles since this type of pack is available in a wide variety of forms and meets the requirements of mechanized packaging processes. The starting materials used for blister packs are thermoformable films. These are plastic films which when heated can be shaped relatively readily by applying super- or subatmospheric pressure pneumatically, or using a ram. Appropriate selection of the molds can thus introduce depressions (blisters) into the film (base film) and these can be matched to the shape of the article to be packed. After this shaping step the article to be packed is introduced into the resulting blister. Once the blister has been filled, a backing film is applied to the base film and encloses the article to be packed within its blister.

If all of the requirements cannot be covered by a single material, the properties required in a film are achieved by combining more than one film to give a composite. Films produced from cycloolefin copolymers have very good impermeability to water vapor. However, these films have poor resistance to fats. Environmental-stress-cracking corrosion occurs on exposure to unsaturated fatty acids.

The film most frequently used in blister packs is polyvinyl chloride (PVC). To increase its barrier properties with respect to gases, in particular water vapor, the PVC base film is frequently coated with PVDC. Films made from unoriented polypropylene (uPP) give better water-vapor barrier properties than PVDC films and are less questionable from an environmental point of view. However, the disadvantage is that this material has poorer thermoformability and higher shrinkage.

The COC mono- or multilayer films described in EP-A-570 188 and EP-A-631 864 when used as base films give good processing and good barrier properties.

Relatively new developments in the area of blister packs for pharmaceuticals describe the use of amorphous polyolefins with good processing performance and levels of high water-vapor barrier properties. For example, EP-A-570 188 and EP-A-631 864 describe the use of polyolefins with cyclic olefins as polymeric building block. These applications describe the use of these polyolefins (cycloolefin copolymers, abbreviated to COC) in the form of mono- or multilayer films for blister packs.

Alongside automated packing and the presentation of the product protected within the blister, for example pharmaceuticals in the form of tablets, capsules or the like, the blister pack can markedly reduce exposure to atmospheric moisture and oxygen and thus increase shelf life.

The object of the present invention is to provide a composite film with a high level of barrier properties, very good thermoformability and good resistance to fats, together with a cost-effective and environmentally friendly process for its production, and also the use of the film for producing blister packs.

The object of the present invention is achieved by a thermoformable composite film comprising at least one film which comprises cycloolefin copolymer and comprising, laminated to at least one side of this film, a thermoplastic PVDC film.

At relative humidity of about 85% and at a temperature of about 23° C. the film has a water-vapor permeability of $\leq 0.05$ g/m²d, a puncture resistance of $\leq 20$ N and a thickness of $\leq 100$ μm.

For producing specific types of packaging, flexible or else rigid films are used to achieve high barrier values with respect to gases, in particular to oxygen and to water vapor. Requirements are becoming more stringent: achievement of greater protection from environmental effects, longer shelf-lives, storage, quality assurance, portioning, transport, information, transparency, printability, sterilizability and UV protection of the products to be packed.

The film has not only to protect the contents but must also have mechanical stability. Release of constituents from within the film must not be allowed to have an adverse effect on the contents. The film must not be damaged by the product. Applications which have all of these requirements to a relatively high degree are pharmaceutical blister packs, push-through packaging (PTP), bags for sensitive solutions, medical equipment, and also blisters, trays and bags for food or drink.

To achieve these specific requirements, film properties are adjusted by combining a number of different materials with one another, by printing, coating, laminating, coextruding or extrusion-coating. Films made from COC (cycloolefin copolymer) have on the one hand very good impermeability to water vapor but on the other hand very poor resistance to fats. Exposure to unsaturated fatty acids leads to corrosion by environmental stress cracking. To avoid this corrsion one or both sides of the COC film is/are preferably protected by combination with another functional plastic. Metallic or ceramic coating in vacuo is also possible.

The object has been achieved by coating the COC film, in pure form or as a blend with other polyolefins or rubbers, with PVDC. This achieves high barrier values. A supplementary surface protection may be applied, as described above, using another plastic, such as PVC, polyamide, polypropylene or polyethylene, or else a metal, such as aluminum, copper or zinc.

The novel composite film has the resistance required together with improved barrier properties. It also fulfils the required conditions for processing. COC films with PVDC coating and PVDC protective laminate can be produced more cost-effectively than PVC/PVDC coatings, PVC/PE/fluorine copolymers or homopolymer laminates or extruded modified acrylonitrile/methyl acrylate copolymers, and with the same or higher barrier values. The water-vapor permeability values for the high-barrier films, measured under DIN and ASTM conditions (23° C., 85% rh) are as shown in Table 1 below for the following film structures:

TABLE 1

| Film structures (Thicknesses [μm]) | Water-vapor permeability (g/m².d [69 μm PVDC = 90 g/m²]) |
|---|---|
| PVC/PE/PVDC (250/30/69) | 0.05 |
| PVC/homofluoropolymer (250/51) | 0.02 |
| COC/PVDC (250/51) | 0.03 |

With PVC-PVDC coatings and to some extent with fluoropolymers, an intermediate PE layer is needed to equilibrate stresses. No intermediate PE layer is required with COC/PVDC coatings.

The films suitable for the purposes of the invention comprise at least one cycloolefin polymer selected from the class consisting of polymers containing from 0.1 to 100% by weight, preferably from 10 to 90% by weight, based on the total weight of the cycloolefin copolymer, of polymerized units of at least one cyclic olefin of the formulae I, II, II', IIII, IV, V or VI

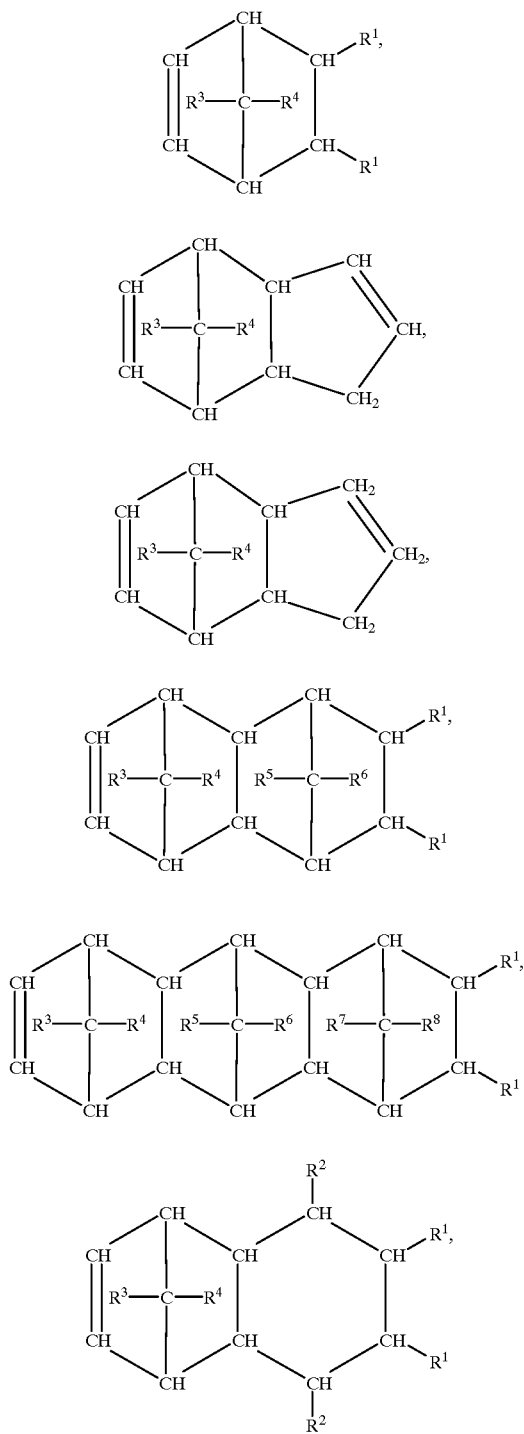

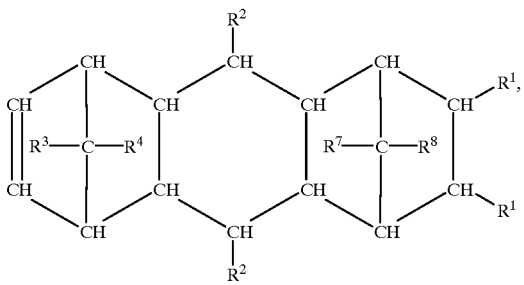

where $R^1$, $R^2$, $R^3$, $R^4$, $R^5$, $R^6$, $R^7$ and $R^8$ are identical or different and are a hydrogen atom or a $C_1$–$C_{20}$-hydrocarbon radical, such as a linear or branched $C_1$–$C_8$-alkyl radical or $C_6$–C18-aryl radical or $C_7$–$C_{20}$-alkylenearyl radical, or a cyclic or acyclic $C_2$–$C_{20}$-alkenyl radical, or form a saturated, unsaturated or aromatic ring, where the same radicals $R^1$ to $R^8$ in the different formulae I to VI may have different meanings, and n may be from 0 to 5, and from 0 to 99.9 mol%, based on the total composition of the cycloolefin copolymer, of polymerized units which derive from one or more acyclic olefins of the formula VII

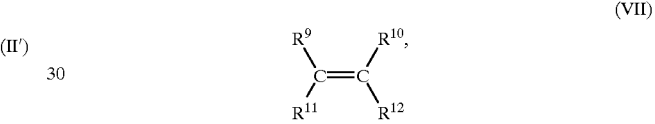

where $R^9$, $R^{10}$, $R^{11}$ and $R^{12}$ are identical or different and are a hydrogen atom, a linear or branched, saturated or unsaturated $C_1$–$C_{29}$-hydrocarbon radical, such as a $C_1$–$C_8$-alkyl radical, or a $C_6$–$C_{18}$-aryl radical.

The cycloolefin copolymers may also be obtained by ring-opening polymerization of at least one of the monomers with the formulae I to VI, followed by hydrogenation of the products obtained.

The novel elastomeric cycloolefin copolymer may also contain from 0 to 45 mol %, based on the total composition of the cycloolefin copolymer, of polymerized units which derive from one or more monocyclic olefins of the

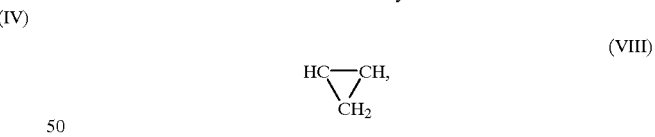

where m is a number from 2 to 10.

The proportion of the polymerized units which derive from cyclic, in particular polycyclic, olefins is preferably from 3 to 75 mol %, based on the total composition of the cycloolefin copolymer. The proportion of the polymerized units which derive from acyclic olefins is preferably from 5 to 80 mol %, based on the total composition of the cycloolefin copolymer.

The cycloolefin copolymers are preferably composed of polymerized units which derive from one or more polycyclic olefins, in particular from polycyclic olefins of the formulae I or 111, and polymerized units which derive from one or more acyclic olefins of the formula VII, in particular α-olefins having from 2 to 20 carbon atoms. Particular preference is given to cycloolefin copolymers which are composed of polymerized units which derive from a polycyclic olefin of the formula I or III and from an acyclic olefin of the formula VII. Preference is also given to terpolymers which are composed of polymerized units which derive from a polycyclic monoolefin of the formula I or III, from an acyclic monoolefin of the formula VII and from a cyclic or acyclic olefin which contains at least two double bonds (polyene), in particular cyclic, preferably polycyclic, dienes, such as norbornadiene, or cyclic, particularly preferably polycyclic, alkenes with a $C_2$–C20-alkenyl radical, such as vinyinorbornene.

The novel elastomeric cycloolefin copolymers preferably comprise olefins with a fundamental norbornene structure, particularly preferably norbornene, tetracyclododecene and, if desired, vinylnorbornene or norbornadiene. Preference is also given to cycloolefin copolymers which contain polymerized units which derive from acyclic olefins with terminal double bonds, such as α-olefins having from 2 to 20 carbon atoms, particularly preferably ethylene or propylene. Particular preference is given to norbornene-ethylene and tetracyclododecene-ethylene copolymers.

Among the terpolymers, particular preference is given to norbornene-vinyinorbornene-ethylene, norbornene-norbornadiene-ethylene, tetracyclododecene-vinyinorbornene-ethylene and tetracyclododecene-vinyltetracyclododecene-ethyiene terpolymers. The proportion of the polymerized units which derive from a polyene, preferably vinyinorbornene or norbornadiene, is from 0.1 to 50 mol %, preferably from 0.1 to 20 mol %, and the proportion of the acyclic monoolefin of the formula VII is from 0 to 99.9 mol %, preferably from 5 to 80 mol %, based on the total composition of the cycloolefin copolymer. In the terpolymers described, the proportion of the polycyclic monoolefin is from 0.1 to 99.9 mol %, preferably from 3 to 75%, based on the total composition of the cycloolefin copolymer.

The cycloolefin copolymer according to the invention preferably comprises at least one cycloolefin copolymer containing polymerized units which derive from polycyclic olefins of the formula I and containing polymerized units which derive from acyclic olefins of the formula VII.

The cycloolefin copolymers according to the invention may be prepared at a temperature of from −78 to 200° C. and at a pressure of from 0.01 to 200 bar, in the presence of one or more catalyst systems which comprise at least one transition metal compound and, if desired, a cocatalyst and, if desired, a support. Suitable transition metal compounds are metallocenes, in particular stereorigid metallocenes. Examples of catalyst systems suitable for preparing the elastomeric cycloolefin copolymers according to the invention are described in EP-A-407 870, EP-A-485 893 and EP-A-503 422. These publications are expressly incorporated herein by way of reference.

Examples of transition metal compounds used are:
rac-dimethylsilylbis(1-indenyl)zirconium dichloride,
rac-dimethylgermylbis(1-indenyl)zirconium dichloride,
rac-phenylmethylsilylbis(1-indenyl)zirconium dichloride,
rac-phenylvinylsilylbis(1-indenyl)zirconium dichloride,
1-siiacyclobutylbis(1-indenyl)zirconium dichloride,
rac-diphenylsiiylbis(1-indenyl)hafnium dichloride,
rac-phenylmethylsilylbis(1-indenyl)hafnium dichloride,
rac-diphenylsilylbis(1-indenyl)zirconium dichloride,
rac-ethylene-1,2-bis(1-indenyi)zirconium dichloride,
dimethylsilyl(9-fluorenyl)(cyclopentadienyl)zirconium dichloride,
diphenylsilyl(9-fluorenyl)(cyclopentadienyl)zirconium dichloride,
bis(1-indenyl)zirconium dichloride,
diphenyimethylene(9-fluorenyl)cyciopentadienylzirconium dichioride,
isopropyiene(9-fluorenyl)cyclopentadienylzirconium dichloride,
rac-isopropylidenebis(1-indenyl)zirconium dichloride,
phenylmethylmethylene(9-fluorenyl)cyclopentadienylzironium dichioride,
isopropylene(9-fluorenyl)(1-(3-isopropyl)cyclopentadienyl)zirconium dichloride,
isopropylene(9-fluorenyl)(1-(3-methyl)cyclopentadienyl)zirconium dichloride,
diphenylmethylene(9-fluorenyl)(1-(3-methyl)cyclopentadienyl)zirconium dichloride,
methylphenylmethylene(9-fluorenyl)(1-(3-methyl)cyclopentadienyl)-zirconium dichloride,
dimethylsilyl(9-fluorenyl)(1-(3-methyl)cyclopentadienyl)zirconium dichloride,
diphenylsilyl(9-fluorenyl)(1-(3-methyl)cyciopentadienyl)zirconium dichloride,
diphenylmethylene(9-fluorenyl)(1-(3-tert-butyl)cyclopentadienyi)zirconium dichloride,
isopropylene(9-fluorenyl)(1-(3-tert-butyl)cyclopentadienyl)zirconium dichloride,
isopropylene(cyclopentadienyl)(1-indenyl)zirconium dichloride,
diphenylcarbonyl(cyclopentadienyl)(1-indenyl)zirconium dichloride,
dimethylsilyl(cyclopentadienyl)(1-indenyl)zirconium dichloride,
isopropylene(methylcyclopentadienyl)(1-indenyl)zirconium dichloride,
4-($\eta^5$-cyclopentadienyl)-4,7,7-trimethyi($\eta^5$-4,5,6,7-tetrahydroindenyl-zirconium dichloride,
[4-($\eta^5$-cyclopentadienyl)-4,7,7-triphenyl($\eta^5$-4,5,6,7-tetrahydroindenyl)]-zirconium dichloride,
[4-($\eta^5$-cyclopentadienyl)-4,7-triphenyl-7-phenyl($\eta^5$-4,5,6,7-tetrahydro-indenyl)]zirconium dichloride,
[4-($\eta^5$-3'-tert-butylcyclopentadienyl)-4,7,7-triphenyl($\eta^5$-4,5,6,7-tetrahydro-indenyl)]zirconium dichloride,
[4-($\eta^5$-3'-tert-butylcyclopentadienyl)-4,7-dimethyl-7-phenyl($\eta^5$-4,5,6,7-tetrahydroindenyl)]zirconium dichloride,
[4-($\eta^5$-3'-methyicyclopentadienyl)-4,7,7-trimethyl($\eta^5$-4,5,6,7-tetrahydroindenyl)]zirconium dichloride,
[4-($\eta^5$-3'-methylcyclopentadienyl)-4,7,7-triphenyl($\eta^5$-4,5,6,7-tetrahydroindenyl)]zirconium dichloride,
[4-($\eta^5$-3'-methylcyclopentadienyl)-4,7-dimethyl-7-phenyl($\eta^5$-4,5,6,7-tetrahydroindenyl)]zirconium dichloride,
[4-($\eta^5$-3'-isopropylcyclopentadienyl)-4,7,7-trimethyl($\eta^5$-4,5,6,7-tetrahydroindenyl)]zirconium dichloride,
[4-($\eta^5$-3'-isopropylcyclopentadienyi)-4,7,7-triphenyl($\eta^5$-4,5,6,7-tetrahydroindenyl)]zirconium dichloride,
[4-($\eta^5$-3'-isopropylcyclopentadienyl)-4,7-dimethyl-7-phenyl($\eta^5$-4,5,6,7-tetrahydroindenyl)]zirconium dichloride,
[4-($\eta^5$-cyclopentadienyl)($\eta^5$-4,5-tetrahydropentalene)]zirconium dichloride,
[4-($\eta^5$-cyclopentadienyl)-4-methyl($\eta^5$-4,5-tetrahydropentalene)]zirconium dichloride,
[4-($\eta^5$-cyclopentadienyl)-4-phenyl($\eta^5$-4,5-tetrahydropentalene)]zirconium dichloride,
[4-($\eta$-3'-methylcyclopentadienyl)($\eta^5$-4,5-tetrahydropentalene)]zirconium dichloride,
[4-($\eta^5$-3'-isopropylcyclopentadienyl)($\eta^5$-4,5-tetrahydropentalene)]zirconium dichloride,
[4-($\eta^5$-3'-benzylcyclopentadienyl)($\eta^5$-4,5-tetrahydropentalene)]-zirconiun dichloride,
[2,2,4-trimethyl-4-($\eta^5$-cyclopentadienyl)($\eta^5$-4,5-tetrahydropentalene)]-zirconium dichloride,

[2,2,4-trimethyl-4-($\eta^5$-(3,4-diisopropyl) cyclopentadienyl)($\eta^5$-4,5-tetrahydro-pentalene)]zirconium dichloride.

The COC films used according to the invention have specific mechanical properties. The films can be processed on the machinery used and also have low puncture resistance and a high level of barrier properties, especially to water vapor. Suitable COC films of this type are unoriented. They may be monolayer films or have more than one layer. The films may comprise organic or inorganic fillers in order to reduce light transmission so as to render the contents invisible (childproof packaging) or in order to improve printability or sealing properties.

The cycloolefin copolymers are prepared by heterogeneous or homogeneous catalysis with organometallic compounds as described in many patents. Catalyst systems based on mixed catalysts made from titanium salts and organoylaluminum compounds are described in DD-A-109 224 and DD-A-237 070. EP-A-156 464 describes the preparation using catalysts based on vanadium. EP-A-283 164, EP-A-407 870, EP-A-485 893 and EP-A-503 422 describe the preparation of cycloolefin polymers using catalysts based on soluble metallocene complexes. The preparation processes described and the catalyst systems used in these patents for preparing COCs are expressly incorporated herein by way of reference.

Unoriented extruded COC films are brittle, making it difficult to find appropriate processing conditions, and their processing performance is poor (cf. DE-A4304309). They readily split or break during winding-up and/or unwinding under tension. For this reason their mechanical strength has to be increased. This may be achieved by orientation (mono- or biaxial stretching) of the films. Films oriented in this way are significantly easier to handle and do not have the disadvantages as described in DE-A-4304309. The puncture resistance of oriented films was studied in accordance with DIN 53373. One measure of puncture resistance is penetration energy. It has now been established that orientation increases the puncture resistance of the films. Without exception, the values found were larger than those of unoriented films of comparable thickness. DE-A-4414669 states that 450 N/mm is excessively high for a film to be useful as a backing film for blister packs. Significantly lower values are desirable on blister packing machinery for fragile pharmaceuticals. The puncture resistances of aluminum foils can be taken as a preliminary guide: that of a (16 $\mu$m) aluminum foil is 90 N/mm. When oriented COC films are used, therefore, it is not possible to ensure easy removal of the pharmaceutical from the blister pack.

Alongside ideal, but not excessively low, puncture resistance, the blister film must have relatively high toughness. Careful balancing of mechanical strength (hardness), flexibility and the force required to compress the compartment is required to enable the contents, such as a tablet, capsule suppository or dragee, to be capable of release from the pack without damage and without unreasonable expenditure of effort. Low expenditure of effort is a particular requirement when elderly people use the product, and also in the clinical sector where medical personnel are continually using pressure to remove tablets and can suffer from fatigue or muscular aching in the fingers.

The water-vapor barrier effectiveness of the films is comparable with that of unoriented COC films, i.e. the orientation has no marked effect on the barrier effectiveness of the films. The thickness of the backing films based on COC films should therefore be within the range of the thicknesses of the films in the blister after forming. The resultant thicknesses for the backing films are from 20 to 150 $\mu$m, preferably from 40 to 100 $\mu$m.

The water-vapor barrier effectiveness is not significantly affected by organic or inorganic additives. It is from 0.2 to 0.4 g/m$^2$ d for a film thickness of 100 $\mu$m. The polarity of the surface can be increased by corona-treating the film.

The additives may be organic polymers, such as polypropylene or polyethylene in the form of homo- or copolymers, polyesters, polyamides, polycarbonate, polyacetals, or acrylate or methacrylate polymers. Inorganic pigments which may be used are titanium dioxide, barium sulfate, calcium sulfate, calcium carbonate and barium carbonate.

One or both sides of the COC film may be laminated with a film which comprises polymers such as unoriented or oriented polyethylene, polypropylene or polyvinyl chloride. The thickness of the film laminated to the COC film is from 5 to 150 $\mu$m, preferably from 10 to 100 $\mu$m, particularly preferably from 20 to 50 $\mu$m. A solvent-free adhesive is preferably used in the lamination, particularly preferably a solvent-free single-component adhesive.

It is preferable for one or both sides of the COC to be laminated with PVDC. As a laminate, COC and PVDC give a flexible, puncture-resistant composite film of good appearance. A further advantage of a laminate made from PVDC and COC for the user, possibly a pharmaceutical blister pack manufacturer, is that it can replace packaging previously composed exclusively of PVDC. The novel laminate made from PVDC and COC is of high quality and has relatively high impermeability to water vapor, and surface contact with the contents is still via the PVDC layer. This simplifies the approval procedure.

The thickness of the entire film is from 200 to 550 $\mu$m, preferably from 160 to 450 $\mu$m and particularly preferably from 20 to 300 $\mu$m. The thickness of the PVDC film is from 5 to 150 $\mu$m, preferably from 10 to 100 $\mu$m and particularly preferably from 20 to 50 $\mu$m. The thickness of the COC film is from 50 to 400 $\mu$m, preferably from 150 to 350 $\mu$m, particularly preferably from 200 to 300 $\mu$m.

The novel thermoformable composite film is used for producing blister packs. Blister packs or PTP (push-through packaging) produced therefrom have very good water-vapor barrier properties, thus increasing the value of the packaged item. It can be used to pack contents such as pharmaceuticals and foodstuffs, in particular pelletized or encapsulated pharmaceuticals, foods containing rice, cookies, snacks, and also hygroscopic items, such as cigarettes and teabags. The PVDC film laminated to at least one side protects the COC base film from fats, thus increasing the stability and value of the laminate.

The invention is described in more detail using a drawing and examples.

DRAWING

The drawing comprises FIGS. 1 to 3.

Figure 1:
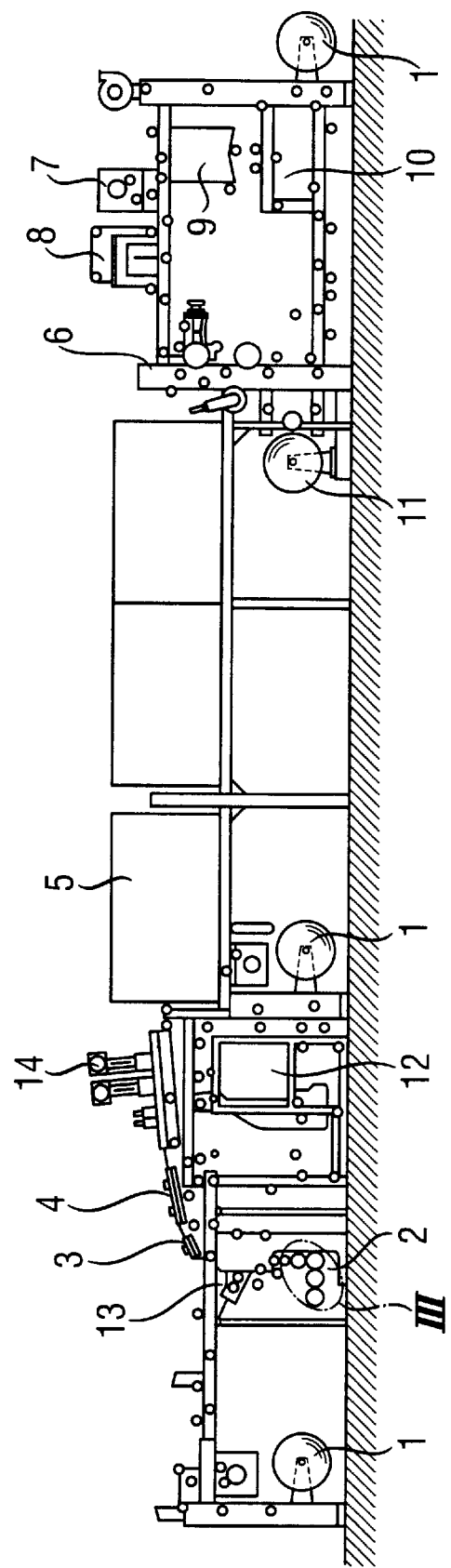
FIG. 1 shows the coating plant
Figure 2A:
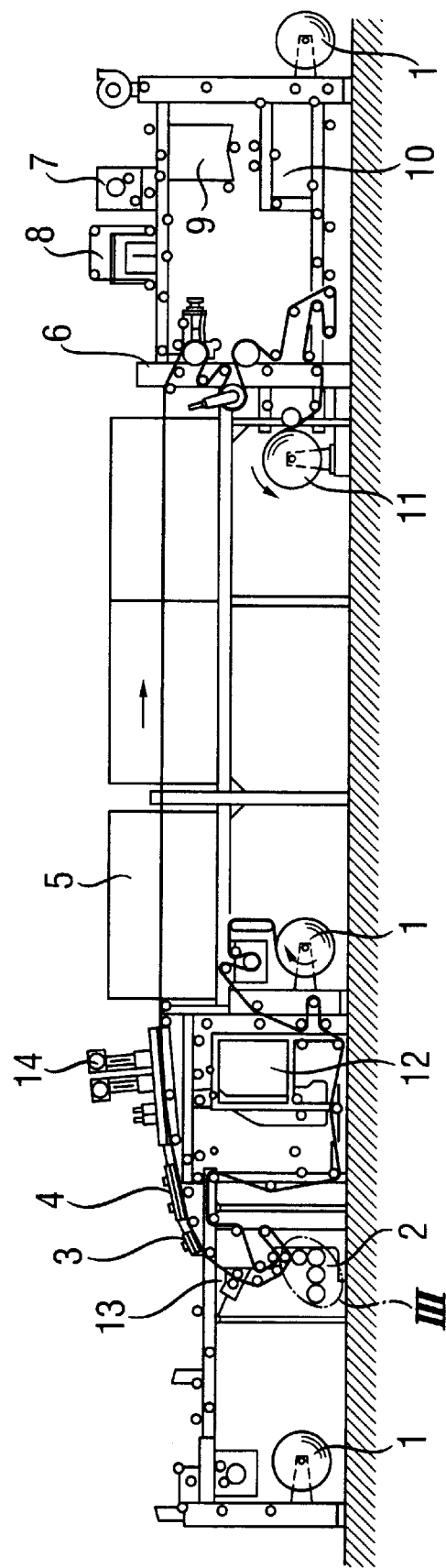
FIG. 2 shows the set-up of the coating plant
Figure 2B:
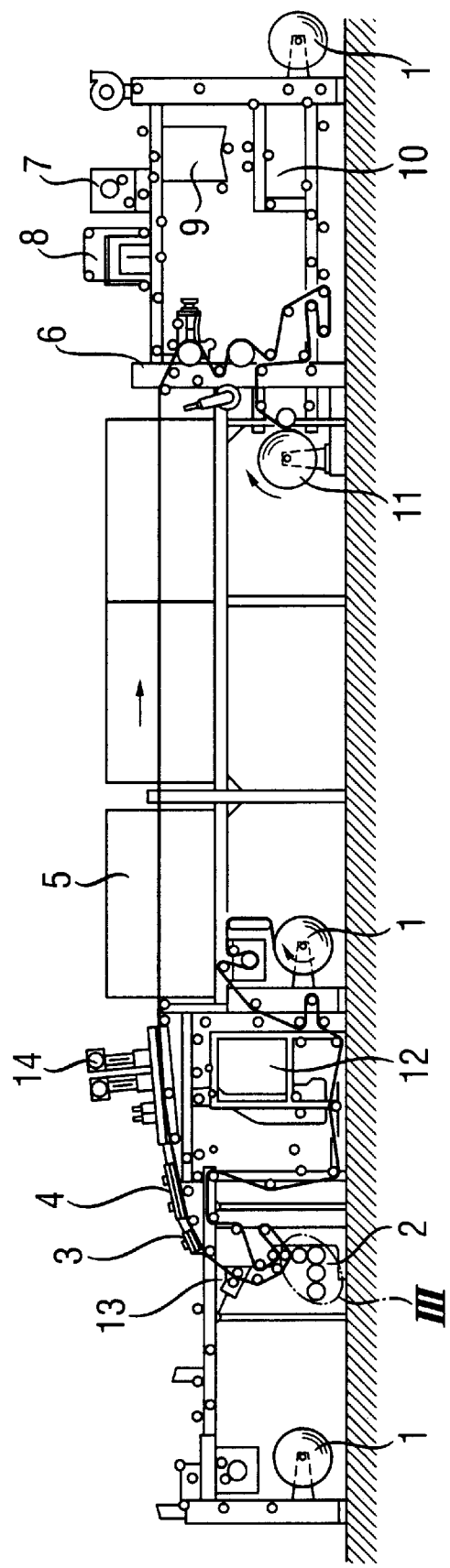
Figure 2C:
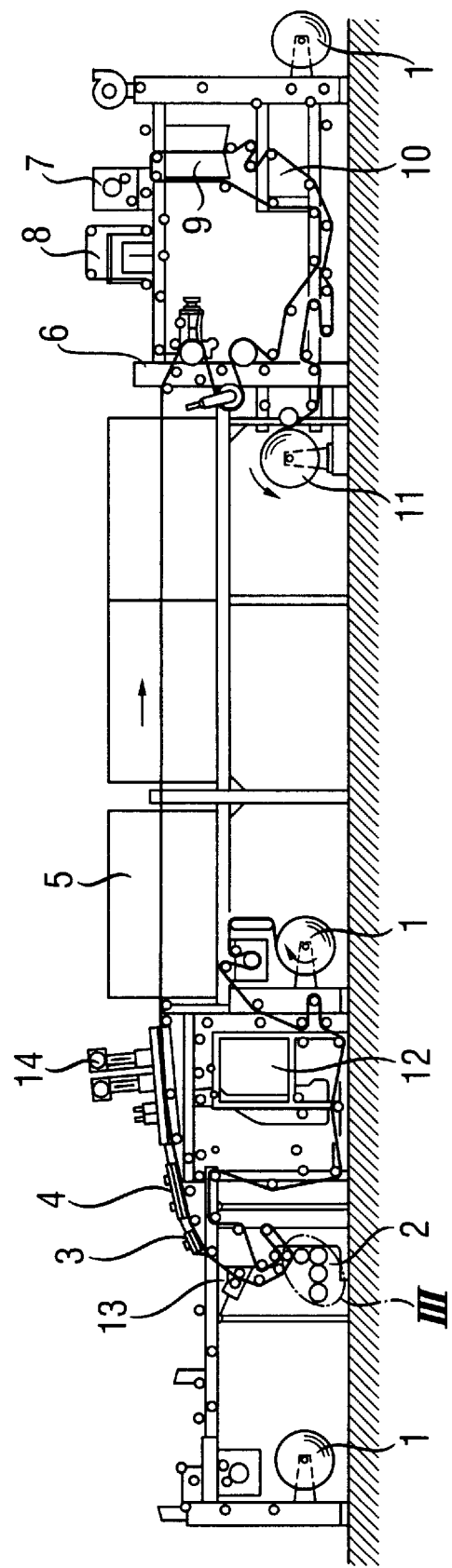
Figure 2D:
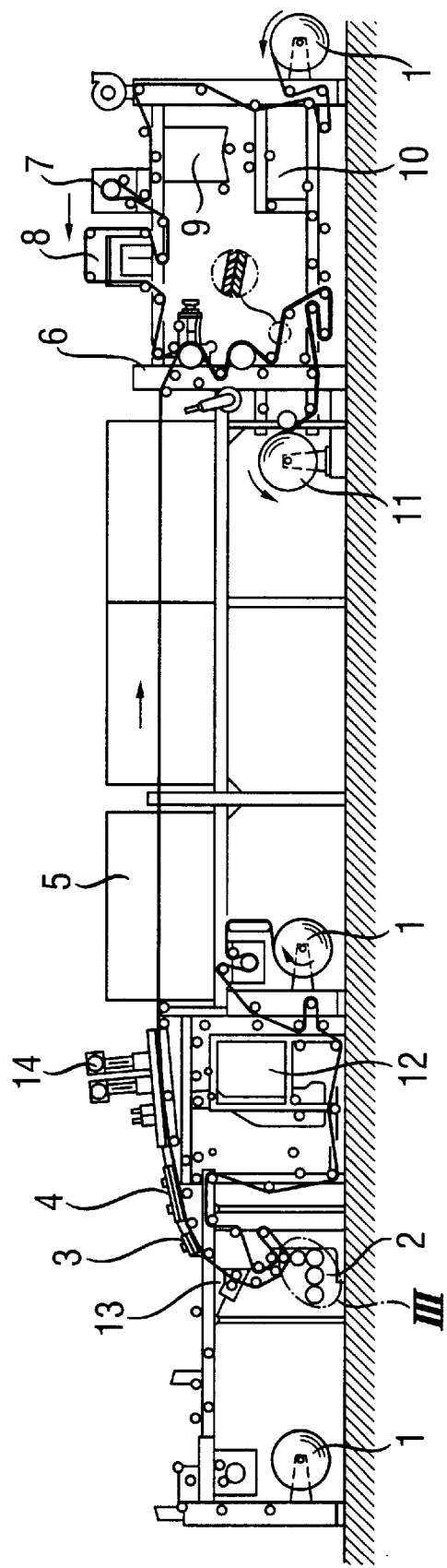

The coating plant of FIG. 1 comprises an unwind (1), application device (2), short wave infrared source (3), medium-wavelength infrared source (4), flotation drier (5), dry-lamination unit (6), corona system (7), web edgeguiding system (8), remoistening equipment (9), cooling unit (10), wind up (11), electron-beam unit (12), wet-lamination unit (13) and UV source (14).

FIG. 2 shows the set-up of the coating plant for the following procedures:

A) thermal drying or UV curing

B) thermal drying with shock cooling

C) thermal drying with remoistening

D) thermal drying with dry lamination

E) thermal drying with UV curing.

Figure 3:
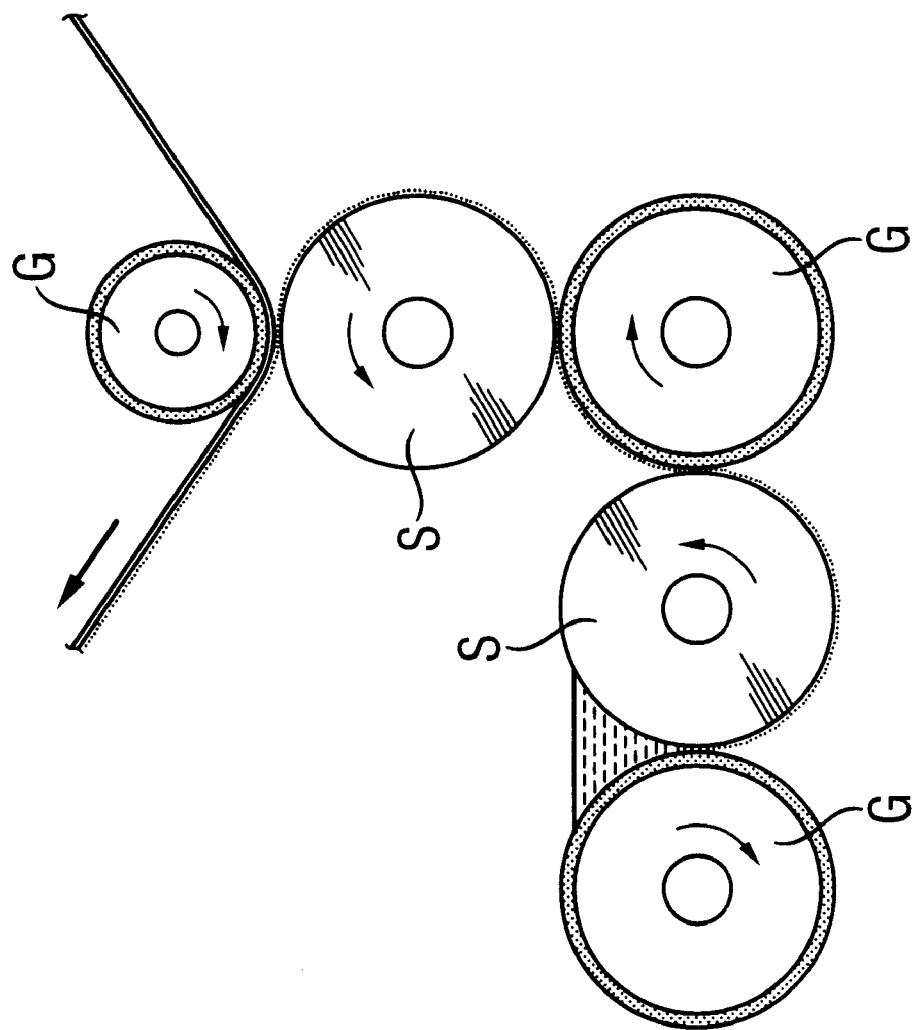
FIG. 3 shows the application device in the coating plant.

FIG. 3 shows the application device in the coating plant with application by smooth rolls using four rolls (wet). G here indicates a rubber roll and S a steel roll. The rolls here are heated and cooled. Application using smooth rolls is particularly suitable for laminating COC with PVDC.

EXAMPLE

Both sides of a COC film of thickness 190 μm (194 g/m²) were laminated with an unoriented PVDC film of thickness 35 μm (46 g/m⁵), using Herberts GmbH 1K-LF 190X3 solvent-free single-component adhesive. Application was at 1.50 g/m². Corona treatment at 48 kW. For lamination a width of 810 mm was used, a speed of 50 m/min, and a smooth-roll application system with four rolls, with one pass for each laminated side. The thickness of the thermoformable composite film was 260 μm. The bond strength of the composite film was high: when this strength was measured it was the composite film which fractured.

Comparative Example

The procedure of the example was followed except that both sides of the COC film were laminated with an unoriented polypropylene film. The thickness of the thermoformable composite film was 210 μm.

What is claimed is us:

1. A thermoformable composite film which consists of
   (a) at least one cycloolefin copolymer film (COC film) having two sides and
   (b) a polyvinylidene chloride (PVDC)- containing thermoplastic film and wherein said PVDC-containing thermoplastic film is laminated to one or both sides of said COC film.

2. The film as claimed in claim 1, wherein the thickness of all the layers of the film is from 160 to 550 μm.

3. The film as claimed in claim 1, wherein the thickness of all the layers of the film is from 200 to 450 μm.

4. The film as claimed in claim 1, wherein the thickness of the PVDC containing theromoplastic film is from 20 to 50 μm and the thickness of the COC film is from 200 to 300 μm.

5. The film as claimed in claim 3, wherein the thickness of the PVDC containing theromoplastic film is from 20 to 50 μm and the thickness of the COC film is from 200 to 300 μm.

* * * * *